United States Patent
Higuchi et al.

(10) Patent No.: US 8,663,383 B2
(45) Date of Patent: Mar. 4, 2014

(54) EXPANSIVE MATERIAL AND ITS PREPARATION PROCESS

(75) Inventors: Takayuki Higuchi, Itoigawa (JP); Taiichiro Mori, Itoigawa (JP); Hideaki Ishida, Itoigawa (JP); Ryoetsu Yoshino, Itoigawa (JP); Minoru Morioka, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 178 days.

(21) Appl. No.: 13/261,027

(22) PCT Filed: May 20, 2010

(86) PCT No.: PCT/JP2010/058516
§ 371 (c)(1),
(2), (4) Date: Nov. 17, 2011

(87) PCT Pub. No.: WO2010/143506
PCT Pub. Date: Dec. 16, 2010

(65) Prior Publication Data
US 2012/0067251 A1    Mar. 22, 2012

(30) Foreign Application Priority Data
Jun. 12, 2009 (JP) .................. 2009-141422

(51) Int. Cl.
*C04B 2/02* (2006.01)
(52) U.S. Cl.
USPC ....................................... 106/738
(58) Field of Classification Search
USPC ....................................... 106/738
See application file for complete search history.

(56) References Cited

U.S. PATENT DOCUMENTS

| 3,884,710 A | 5/1975 | Allen et al. |
| 3,947,288 A * | 3/1976 | Kawano et al. ............... 106/735 |
| 4,205,994 A | 6/1980 | Moyer, Jr. et al. |
| 5,846,316 A | 12/1998 | Rice |

FOREIGN PATENT DOCUMENTS

| EP | 1384704 A1 | 1/2004 |
| JP | S58-154779 | 9/1983 |
| JP | 2003-206167 | 7/2003 |
| JP | 2008239392 A | 10/2008 |
| JP | 4244261 B2 | 3/2009 |

OTHER PUBLICATIONS

European Patent Office, "European Search Report for EP10786037," Sep. 27, 2013.

* cited by examiner

*Primary Examiner* — Paul Marcantoni
(74) *Attorney, Agent, or Firm* — Manabu Kanesaka

(57) ABSTRACT

The invention provides an expansive material that allows for large expansion of concrete at a material age of 2 to 7 days after pouring and permits concrete to have higher initial compressive strength and makes sure good storage stability, and a process for preparing that expansive material.

The invention provides an expansive material and a process for preparing that expansive material, characterized in that clinker or pulverized clinker containing free lime, a hydraulic compound and calcium sulfate anhydrite is heat treated in a carbon dioxide gas atmosphere to form calcium carbonate in it. Preferably, the expansive material contains a particle in which the free lime, hydraulic compound, calcium sulfate anhydrite and calcium carbonate are all present; the content of calcium carbonate is 0.5 to 10% by mass; and the expansive material has a Blaine's specific surface area of 1,500 to 90,000 $cm^2/g$. The expansive material is blended with cement into a cement composition. The preparation conditions are preferably a carbon dioxide gas flow rate of 0.01 to 0.1 L/min. and a temperature of 200 to 800° C., under which conditions there is calcium carbonate formed.

9 Claims, No Drawings

US 8,663,383 B2

EXPANSIVE MATERIAL AND ITS PREPARATION PROCESS

RELATED APPLICATIONS

The present application is National Phase of International Application No. PCT/JP2010/058516 filed May 20, 2010, and claims priority from Japanese Application No. 2009-141422, filed Jun. 12, 2009.

BACKGROUND OF THE INVENTION

1. Field of the Invention

The present invention relates to an expansive material for concrete used in the civil engineering and construction fields, and its preparation process.

2. Description of the Prior Art

Some proposals have been offered of a concrete expansive material capable of developing good expansion capability in small amounts (Patent Publication 1), and an expansive material for cement in which the surface of quicklime is coated with calcium carbonate (Patent Publication 2). It has also been proposed to carbonate the surface of soft burnt slaked or hydrated lime for use as a pulverizing material for set cement concrete (Patent Publication 3).

In the steel field, there has been a lime carbonation technique proposed for the purpose of holding back the hygroscopicity of lime used as a desulfurization agent.

LISTING OF THE PRIOR ART PUBLICATIONS

Patent Publication

Patent Publication 1: U.S. Pat. No. 4,244,261
Patent Publication 2: JP(A) 54-93020
Patent Publication 3: JP(A) 58-154779

Non-Patent Publication

Non-Patent Publication 1:
"Regarding the inhibition of the hygroscopicity of quicklime by partial carbonation", Iron and Steel, 1978, Vol. 64, No. 2, pp 56-65

SUMMARY OF THE INVENTION

A typical conventional expansive material has a characteristic feature of expanding rapidly over one or two days after pouring of concrete, and then slowly until a material age of 7 days. At the material age of one or two days, however, the hydration reaction of cement in concrete does not sufficiently proceed, causing the matrix to get coarse and have large creeps, often resulting in a great likelihood of elimination of prestress introduced by the expansive material into reinforcing steel. Thus there is still mounting demand for an expansive material that, albeit being in small amounts, expands less at a material age of one or two days and more at a material age of 2 to 7 days, especially 5 to 7 days. A problem with the prior art expansive material is that when stored over an extended period in high-temperature and humidity atmospheres, the ability to expand goes worse and, especially when pre-mixed with cement, the ability to expand goes by far worse. Keeping at hand expansive cement having cement mixed with an expansive material has a merit of not only saving troublesome pouring at a liquid concrete plant but also averting the pop-out phenomenon caused by coagulation of the expansive material resulting from poor kneading. However, such problems as mentioned above are practically in the way to taking advantage of that merit.

Therefore, the object of the invention is to provide an expansive material that allows for a large expansion of concrete over 2 to 7 days after pouring, permits concrete to have high initial compressive strength, and has improved storage stability, and its preparation process.

Means for Accomplishing the Object

According to the present invention, there is an expansive material provided, which is characterized by being obtained by heat treatment of clinker or pulverized clinker containing free lime, a hydraulic compound and calcium sulfate anhydrite in a carbon dioxide gas atmosphere to form calcium carbonate therein.

In one embodiment of the invention, the expansive material contains a particle in which the free lime, hydraulic compound, calcium sulfate anhydrite and calcium carbonate are all present.

In another embodiment of the invention, the expansive material contains calcium carbonate in an amount of 0.5 to 10% by mass.

In yet another embodiment of the invention, the expansive material has a Blaine's specific surface area ranging from 1,500 to 9,000 $cm^2/g$.

In a further embodiment of the invention, the expansive material further comprises calcium sulfate anhydrite added to the clinker or pulverized clinker heat treated in a carbon dioxide gas atmosphere to form calcium carbonate therein.

In a further embodiment of the invention, the expansive material further comprises a shrinkage reducer added to the clinker or pulverized clinker heat treated in a carbon dioxide gas atmosphere to form calcium carbonate therein.

In a further embodiment of the invention, there is a cement composition provided, in which any one of the expansive materials is blended with cement.

In a further embodiment of the invention, there is a process for preparing any one of the expansive materials by heat treatment of clinker or pulverized clinker containing free lime, a hydraulic compound, and calcium sulfate anhydrite in a carbon dioxide gas atmosphere to form calcium carbonate therein.

In a further embodiment of the invention, the expansive material preparation process comprises filling a carbonating vessel up with clinker or pulverized clinker to form calcium carbonate therein at a carbon dioxide gas flow rate of 0.01 to 0.1 L/min. per liter of the vessel and at a temperature of 200 to 800° C. prevailing in the vessel.

Advantages of the Invention

According to the present invention, there can be an expansive material obtained that allows for a large expansion of concrete at a material age of 2 to 7 days after pouring, permits concrete to have high compressive strength at a material age of 7 days, and is held back in terms of a decrease in the expansion capability even as stored over an extended period.

EMBODIMENTS FOR CARRYING OUT THE INVENTION

Unless otherwise stated, the "parts" and "%" used herein are given on a mass basis.

The term "concrete" used herein is a general term for cement pastes, cement mortars, and cement concretes.

The expansive material of the invention is obtained by treatment with carbon dioxide gas of clinker in a non-pulverized or pulverized form, said clinker being obtained by heat treatment of an appropriate mixture of CaO raw material, $Al_2O_3$ raw material, $Fe_2O_3$ raw material, $SiO_2$ raw material, and $CaSO_4$ raw material.

The "free lime" referred to herein is what is usually called f-CaO.

The "hydraulic compound" referred to herein, for instance, includes hauyne represented by $3CaO.3Al_2O_3.CaSO_4$, calcium silicate represented by $3CaO.SiO_2$ (called $C_3S$ for short) or $2CaO.SiO_2$ (called $C_2S$ for short), calcium aluminoferrite represented by $4CaO.Al_2O_3.Fe_2O_3$ (called $C_4AF$ for short), $6CaO.2Al_2O_3.Fe_2O_3$ (called $C_6A_2F$ for short) or $6CaO.Al_2O_3.Fe_2O_3$ (called $C_6AF$ for short), and calcium ferrite represented by $2CaO.Fe_2O_3$ (called $C_2F$ for short). Preferably, these compounds are used singly or in combinations of two or more. There is no particular limitation imposed on the morphology of calcium carbonate contained in the inventive expansive material.

The CaO raw material includes lime stone and slaked or hydrated lime; the $Al_2O_3$ raw material includes bauxite, aluminum ashes, etc.; the $Fe_2O_3$ raw material includes copper slag or commercially available iron oxide; the $SiO_2$ raw material includes fluorite or the like; and the $CaSO_4$ raw material includes calcium sulfate dihydrite, calcium sulfate hemihydrite, and calcium sulfate anhydrite.

These raw materials often contain impurities, but they offer no practical problem within such a range as to be not detrimental to the advantages of the invention. Exemplary impurities include MgO, $TiO_2$, $ZrO_2$, MnO, $P_2O_5$, $Na_2O$, $K_2O$, $Li_2O$, sulfur, fluorine, and chlorine.

Although there is no specific limitation on how to heat treat the clinker used in the expansive material of the invention, yet it is preferable to fire the clinker at a temperature of 1,100 to 1,600° C., especially 1,200 to 1,500° C. in an electric furnace, kiln or the like. At less than 1,100° C., the expansion capability is less than satisfactory, and at temperatures exceeding 1,600° C., calcium sulfate anhydrite may possibly decompose.

The contents of the respective minerals contained in the clinker used in the expansive material of the invention are preferably in the following ranges. The content of free lime is preferably 10 to 70 parts, more preferably 40 to 60 parts per 100 parts of clinker. The content of the hydraulic compound is preferably 10 to 50 parts, more preferably 20 to 30 parts per 100 parts of clinker. The content of calcium sulfate anhydrite is preferably 1 to 50 parts, more preferably 20 to 30 parts per 100 parts of clinker. When the content of calcium sulfate anhydrite in the clinker is smaller, it is preferable to use fresh calcium sulfate anhydrite to prepare the inventive expansive material. Any deviation from such ranges may often give rise to all too large an amount of expansion resulting in lower compressive strength, or a decrease in the amount of expansion at a material age of 2 to 7 days, especially 5 to 7 days.

The contents of the minerals may be confirmed by conventional, ordinary analysis methods. For instance, a pulverized sample is set on a powder X-ray diffraction system to check up the ensuing minerals and analyze data by the Rietveld method, thereby identifying the amounts of the minerals. The amounts of the minerals may also be figured out by calculation on the basis of chemical ingredients and the results of identification of powder X-ray diffraction.

The conditions for treatment with carbon dioxide gas for the purpose of preparing the inventive expansive material preferably lie in the following ranges.

Preferably, the flow rate of carbon dioxide gas to the carbonating vessel is 0.01 to 0.1 L/min. per liter of the volume of the carbonating vessel. At a flow rate of less than 0.1 L/min., much time is often taken for the carbonation of the clinker, and increasing the flow rate up beyond 0.1 L/min. does not result in further improvement in the carbonation rate: it is not economical. Note here that this flow rate condition holds true only for the case where a crucible used as the carbonating vessel is placed in an electrical furnace through which carbon dioxide gas prevails for reaction with the clinker; that is, it does not hold true for other cases where carbon dioxide gas is allowed to react with the clinker in other ways. Using off gases exiting out from a lime firing furnace instead of carbon dioxide gas for carbonation is preferable for improvements in the expansion capability.

The carbonating vessel is preferably set at a temperature of 200 to 800° C. At less than 200° C., the carbonation reaction of the clinker does not often proceed any more, and temperatures exceeding 800° C. often result in the inability to form calcium carbonate, because even though the clinker is once turned into calcium carbonate, de-carbonation reaction occurs again.

It is here to be noted that the clinker in a non-pulverized form may be carbonated as such or, alternatively, the clinker may be pulverized before carbonation. There is no particular limitation on the carbonating vessel referred to herein; in other words, any type vessel may be used provided that contact and reaction of the clinker with carbon dioxide gas takes place. For instance, use may be made of an electrical furnace, a fluidized bed type heating furnace, and a mill for pulverizing the clinker.

The proportion of calcium carbonate is preferably 0.5 to 10 parts, more preferably 1 to 5 parts per 100 parts of clinker. Unless the composition ratio of each mineral is within the aforesaid range, neither may there be good expansion capability obtained, nor may there be high initial compressive strength and storage stability obtained.

The content of calcium carbonate may be quantified from weight changes in association with the de-carbonation of calcium carbonate by differential thermal analysis (TG-DTA) or differential scanning calorimetry (DSC).

Preferably in the inventive expansive material, the free lime, hydraulic compound, calcium sulfate anhydrite and calcium carbonate are all present in the same particle.

Whether or not the free lime, hydraulic compound, calcium sulfate anhydrite and calcium carbonate are all present in the same particle may be confirmed by an electron microscope or the like.

More specifically, the expansive material is wrapped with and embedded in a resin, and surface-treated with an argon ion beam to observe the structure in section of the particle and implement elemental analysis thereby confirming whether or not calcium carbonate is present in the same particle.

The fineness of powder of the inventive expansive material ranges from preferably 1,500 to 9,000 $cm^2/g$, more preferably 2,000 to 4,000 $cm^2/g$ as represented in terms of the Blaine's specific surface area. At less than 1,500 $cm^2/g$, the expansive material will go on expanding over an extended period of time, often resulting in the breakdown of the concrete structure, and at greater than 9,000 $cm^2/g$, the expansion capability will often decrease.

There is no particular limitation on the amount of the inventive expansive material used because it varies with the amount of concrete blended; however, it is usually preferable that it is 3 to 12 parts, especially 5 to 9 parts per 100 parts of the cement composition comprising cement and the expansive material. An amount of less than 3 parts will often result in the inability to obtain sufficient expansion capability, and an amount of greater than 12 parts will often give rise to over-expansion, leading to expansive cracks in concrete.

The cement used with the inventive cement composition, for instance, includes Portland cements such as normal, high-early-strength, ultra-high-early-strength, low heat, and moderate heat Portland cements, mixed cements comprising those cements mixed with blast furnace slag, fly ash, and silica, and filler cement mixed with limestone powders.

The inventive expansive material may be used in combination with sand, gravel, water-reducing agent, high-performance water-reducing agents, AE water-reducing agents, high-performance AE water-reducing agents, fluidizing agents, defoaming agents, thickeners, rust preventives, freeze preventives, shrinkage reducers, polymer emulsions and setting regulators as well as cement rapid setting agents, clay minerals such as bentonite, ion exchangers such as zeolite, finely divided silica powders, calcium carbonate, calcium hydroxide, calcium sulfates, calcium silicate, and fibrous materials such as vinylon fibers, acrylic fibers, and carbon fibers. Especially as the inventive expansive material is used in combination with the shrinkage reducers, it allows for a larger expansion of concrete. There is no specific limitation on the type of the shrinkage reducer; however, particular preference is given to low-molecular-weight alkylene oxide copolymers, glycol ether•aminoalcohol derivatives, and alkylene oxide adducts of lower alcohols. There may be commercial products available such as SK Guard made by DENKA, HIBIGUARD made by FBK, HIBIDAN made by TAKEMOTO OIL & FAT CO., LTD., and TETRAGUARD made by TAIHEIYO CEMENT CORPORATION.

The present invention will now be explained at great length with reference to examples.

Example 1

The CaO raw material, $Al_2O_3$ raw material, $Fe_2O_3$ raw material, $SiO_2$ raw material and $CaSO_4$ raw material were blended together in such a way as to provide the mineral proportions set out in Table 1, and the blend was mixed and pulverized and heat treated at 1,350° C. for synthesis into clinker that was in turn pulverized in a ball mill to a Blaine's specific surface area of 3,000 cm$^2$/g. Twenty-five (25) grams of the pulverized clinker were placed in an alumina crucible that was then set in an electric furnace. With a carbon dioxide gas flow rate set at 0.05 L/min. per liter of the electric furnace's internal volume and a firing temperature set at 600° C., the clinker was subjected to a one-hour reaction into an expansive material, in which the ensuing calcium carbonate was quantified.

The expansive material was used in an amount of 4 parts or 7 parts per 100 parts of a cement composition comprising cement and the expansive material to prepare mortars having a water/cement composition ratio of 50% and a cement composition/sand ratio of ⅓ in a 20° C. room. Then, each mortar was measured in terms of percent length changes and compressive strength.

For comparison purposes, similar experimentation was carried out, using pulverized clinker free from a hydraulic substance and calcium sulfate anhydrite, expansive materials obtained by only treatment of that clinker with carbon dioxide gas (Experiment Nos. 1-8, 1-9, 1-10, 1-11), expansive materials of that clinker without being subjected to treatment with carbon dioxide gas (Experiment Nos. 1-12, 1-13, 1-14), and an expansive material having calcium carbonate powders mixed with an expansive material only subjected to pulverization without being treated with carbon dioxide gas (Experiment No. 1-15). Accelerated storage testing was also made of the respective expansive materials and expansive cement compositions.

Raw Materials
CaO Raw Material: Limestone
$Al_2O_3$ Raw Material: Bauxite
$Fe_2O_3$ Raw Material: Iron Oxide
$SiO_2$ Raw Material: Silica Stone
$CaSO_4$ Raw Material: Calcium Sulfate Dihydrite
Carbon Dioxide Gas: Commercial Gas Product
Sand: JIS Standard Sand
Cement: Commercial Cement Product: Normal Portland Cement
Calcium Carbonate Powders: 200-Mesh Commercial Product Testing Methods The compositions of the minerals were found by calculation on the basis of chemical compositions and the results of identification by powder X-ray diffraction.

The calcium carbonate formed was quantified from a weight change in association with decarbonation on a differential thermobalance (TG-DTA) at 500 to 750° C.

For the distribution of minerals in the expansive material particle, the expansive material was placed in a silicon container, in which an epoxy resin was cast and cured. Then, the cured resin was processed in section by an ion beam processing machine (SM-09010 made by JEOL Ltd.) to determine the mineral distribution on an SEM-EDS analyzer.

Percent length changes up to the material age of 7 days (d) were measured pursuant to the expansion testing method by mortar according to JIS A 6202, Appendix 1.

Compressive strength was determined by preparing a test piece of 4×4×16 cm and measuring its compressive strength at the material age of 7 days according to JIS R 5201.

For accelerated storage testing (for expansive material), 100 grams of each expansive material were spread wide on a stainless tray of 10×10 cm square, and let stand in a room of 20° C./60% RH for 10 days with nothing placed over it. After the elapse of 10 days, the samples were picked up and measured for the percent length changes of mortar.

For accelerated storage testing (for expansive cement), each expansive cement composition was packed up in a paper bag that was heat sealed for a one-month storage in a room of 35° C./90% RH to determine the percent length changes of mortar.

TABLE 1

| Ex. No. | Clinker Mineral Composition (%) | | | | | Carbon Dioxide Gas Treatment | Amount of Calcium Carbonate Formed (%) |
| --- | --- | --- | --- | --- | --- | --- | --- |
| | f-CaO | Hauyne | $C_4AF$ | $C_2S$ | $CaSO_4$ | | |
| 1-1 | 10 | 30 | 5 | 10 | 45 | Carried out | 2.0 |
| 1-2 | 20 | 30 | 2 | 3 | 45 | Carried out | 3.0 |
| 1-3 | 40 | 20 | 5 | 5 | 30 | Carried out | 4.5 |
| 1-4 | 50 | 10 | 5 | 5 | 30 | Carried out | 5.0 |

TABLE 1-continued

| | | | | | | | |
|---|---|---|---|---|---|---|---|
| 1-5 | 50 | 5 | 0 | 25 | 20 | Carried out | 5.0 |
| 1-6 | 60 | 5 | 0 | 5 | 30 | Carried out | 6.0 |
| 1-7 | 70 | 10 | 5 | 5 | 10 | Carried out | 7.0 |
| 1-8 | 100 | 0 | 0 | 0 | 0 | Not carried out | 0.0 |
| 1-9 | 100 | 0 | 0 | 0 | 0 | Not carried out | 0.0 |
| 1-10 | 100 | 0 | 0 | 0 | 0 | Carried out | 8.0 |
| 1-11 | 100 | 0 | 0 | 0 | 0 | Carried out | 8.0 |
| 1-12 | 10 | 30 | 5 | 10 | 45 | Not carried out | 0.0 |
| 1-13 | 50 | 10 | 5 | 5 | 30 | Not carried out | 0.0 |
| 1-14 | 70 | 10 | 5 | 5 | 10 | Not carried out | 0.0 |
| 1-15 | 50 | 10 | 5 | 5 | 30 | Not carried out | 5.0 |

| Ex. No. | Presence of Particles Containing All Essential Minerals | Proportion of the Expansive Materials Added (parts) |
|---|---|---|
| 1-1 | Found | 7 |
| 1-2 | Found | 7 |
| 1-3 | Found | 7 |
| 1-4 | Found | 7 |
| 1-5 | Found | 7 |
| 1-6 | Found | 7 |
| 1-7 | Found | 7 |
| 1-8 | Not found | 4 |
| 1-9 | Not found | 7 |
| 1-10 | Not found | 4 |
| 1-11 | Not found | 7 |
| 1-12 | Not found | 7 |
| 1-13 | Not found | 7 |
| 1-14 | Not found | 7 |
| 1-15 | Not found | 7 |

| | Percent Length Changes (%) | | | | | | | | | | |
|---|---|---|---|---|---|---|---|---|---|---|---|
| Ex. No. | 0 | 1 d | 2 d | 3 d | 5 d | 7 d | 2-7 d | 5-7 d | (A)* | (B)* | (C)* | (D)* |
| 1-1 | 0 | 20 | 50 | 130 | 150 | 185 | 135 | 35 | 180 | 97 | 180 | 97 |
| 1-2 | 0 | 15 | 100 | 200 | 230 | 250 | 150 | 20 | 250 | 100 | 250 | 100 |
| 1-3 | 0 | 10 | 130 | 280 | 380 | 430 | 240 | 50 | 420 | 98 | 440 | 102 |
| 1-4 | 0 | 15 | 200 | 290 | 390 | 450 | 250 | 60 | 440 | 98 | 460 | 102 |
| 1-5 | 0 | 20 | 160 | 200 | 380 | 420 | 260 | 40 | 415 | 99 | 420 | 100 |
| 1-6 | 0 | 20 | 300 | 375 | 490 | 520 | 220 | 30 | 510 | 98 | 540 | 104 |
| 1-7 | 0 | 60 | 830 | 1,200 | 1,250 | 1,270 | 440 | 20 | 1,200 | 94 | 1,130 | 89 |
| 1-8 | 0 | 400 | 430 | 440 | 450 | 450 | 20 | 0 | 50 | 11 | 200 | 44 |
| 1-9 | 0 | 1,050 | 2,060 | 2,090 | 2,100 | 2,100 | 40 | 0 | 700 | 33 | 900 | 43 |
| 1-10 | 0 | 10 | 20 | 450 | 470 | 480 | 460 | 10 | 400 | 83 | 390 | 81 |
| 1-11 | 0 | 120 | 1,879 | 2,720 | 2,800 | 2,810 | 940 | 10 | 2,200 | 78 | 2,300 | 82 |
| 1-12 | 0 | 50 | 85 | 110 | 160 | 180 | 95 | 20 | 120 | 67 | 150 | 83 |
| 1-13 | 0 | 190 | 380 | 415 | 450 | 455 | 75 | 5 | 220 | 48 | 330 | 73 |
| 1-14 | 0 | 400 | 440 | 480 | 490 | 500 | 60 | 10 | 200 | 40 | 340 | 68 |
| 1-15 | 0 | 180 | 430 | 460 | 480 | 490 | 60 | 10 | 230 | 47 | 350 | 71 |

| Ex. No. | Compressive strength (N/mm$^2$) 7 d | Remarks |
|---|---|---|
| 1-1 | 37.5 | Inventive |
| 1-2 | 37.4 | Inventive |
| 1-3 | 36.0 | Inventive |
| 1-4 | 35.0 | Inventive |
| 1-5 | 32.6 | Inventive |
| 1-6 | 32.4 | Inventive |
| 1-7 | 28.1 | Inventive |
| 1-8 | 25.3 | Comparative |
| 1-9 | 20.5 | Comparative |
| 1-10 | 17.9 | Comparative |
| 1-11 | 10.3 | Comparative |
| 1-12 | 37.4 | Comparative |
| 1-13 | 33.0 | Comparative |
| 1-14 | 26.7 | Comparative |
| 1-15 | 33.3 | Comparative |

(A)*: Stored Expansive material 7 d
(B)*: Residual Expansion Rate (Stored Material 7 d/7 d)
(C)*: Stored Expansive Cement Material 7 d
(D)*: Residual Expansion Rate (Stored Material 7 d/7 d)

As can be seen from Table 1, the inventive expansive materials (Experiment Nos. 1-1 to 1-7), in which the pulverized clinker containing free lime (f-CaO), hydraulic compound (hauyne, $C_4AF$, $C_2S$) and calcium sulfate anhydrite ($CaSO_4$) was heat treated in a carbon dioxide gas atmosphere to form calcium carbonate in it, were found to have larger percent length changes for 2-7 d and 5-7 d, allow the cement compositions (concretes) to expand much more at the material ages of 2 days to 7 days and the concretes to have higher compressive strength at the material age of 7 days, and permit the expansion capability to decrease less even as stored over an extended period of time.

In contrast, the comparative expansive materials (Experiment Nos. 1-8 and 1-9), in which the pulverized clinker containing only free lime (f-CaO) in the absence of the hydraulic compound and calcium sulfate anhydrite is not subjected to heat treatment in a carbon dioxide gas atmosphere, were found to have smaller percent length changes and lower compressive strength for 2-7 d and 5-7 d, and cause the expansion capability to decrease significantly as stored over an extended period of time. The comparative expansive materials (Experiment Nos. 1-10 and 1-11), in which that the clinker was heat treated in a carbon dioxide gas atmosphere, were found to have large percent length changes for 2-7 d but small percent length changes and low compressive strength for 5-7 d, and cause the expansion capability to decrease a little bit. At an increased content of carbon dioxide gas, the amount of expansion was found to increase extremely, leading to a further decrease in compressive strength.

The comparative expansive materials (Experiment Nos. 1-12, 1-13 and 1-14) in which the clinker was only pulverized in the absence of treatment with carbon dioxide gas, and the comparative expansive material (Experiment No. 1-15) in which the clinker only subjected to pulverization in the absence of treatment with carbon dioxide gas was mixed with calcium carbonate powders were found to have small percent length changes for 2-7 d and 5-7 d, and cause the expansion capability to decrease as stored over an extended period of time.

Experimental Example 2

Experimental Example 1 was repeated with the exception that the contents per 100 parts of clinker of free lime, hauyne, calcium aluminoferrite ($4CaO.Al_2O_3.Fe_2O_3:C_4AF$), calcium silicate ($2CaO.SiO_2:C_2S$) and calcium sulfate anhydrite remained fixed to 50 parts, 10 parts, 5 parts, 5 parts and 30 parts, respectively, and the flow rate of carbon dioxide gas, the treatment temperature and the reaction time were varied as set out in Table 2.

TABLE 2

| Ex. No. | Conditions for Carbon Dioxide Gas Treatment | | | Amount of the Calcium Carbonate Formed (%) |
|---|---|---|---|---|
| | Flow Rate (L/min) | Temp. (°C.) | Time (hours) | |
| 2-1 | 0.01 | 600 | 1 | 0.5 |
| 1-4 | 0.05 | 600 | 1 | 5.0 |
| 2-2 | 0.1 | 600 | 1 | 5.2 |
| 2-3 | 0.05 | 600 | 0.1 | 1.0 |
| 2-4 | 0.05 | 600 | 0.25 | 1.6 |
| 2-5 | 0.05 | 600 | 10 | 9.8 |
| 2-6 | 0.05 | 600 | 20 | 12.0 |
| 2-7 | 0.05 | 400 | 1 | 1.5 |
| 2-8 | 0.05 | 200 | 1 | 0.5 |
| 2-9 | 0.05 | 800 | 1 | 3.9 |
| 2-10 | 0.05 | 1,000 | 1 | 0.0 |

| Ex. No.. | Presence of particles containing all Essential Minerals | Proportion of the Expansive Materials Added (parts) |
|---|---|---|
| 2-1 | Found | 7.0 |
| 1-4 | Found | 7.0 |
| 2-2 | Found | 7.0 |
| 2-3 | Found | 7.0 |
| 2-4 | Found | 7.0 |
| 2-5 | Found | 7.0 |
| 2-6 | Found | 7.0 |
| 2-7 | Found | 7.0 |
| 2-8 | Found | 7.0 |
| 2-9 | Found | 7.0 |
| 2-10 | Not found | 7.0 |

| Ex. No. | Percent Length Change (%) | | | | | | | | | | | |
|---|---|---|---|---|---|---|---|---|---|---|---|---|
| | 0 | 1 d | 2 d | 3 d | 5 d | 7 d | 2-7 d | 5-7 d | (A)* | (B)* | (C)* | (D)* |
| 2-1 | 0 | 180 | 360 | 420 | 450 | 490 | 130 | 40 | 370 | 76 | 460 | 94 |
| 1-4 | 0 | 15 | 200 | 290 | 390 | 450 | 250 | 60 | 440 | 98 | 460 | 102 |
| 2-2 | 0 | 5 | 180 | 265 | 330 | 380 | 200 | 50 | 380 | 100 | 390 | 103 |
| 2-3 | 0 | 80 | 300 | 440 | 500 | 550 | 250 | 50 | 530 | 96 | 540 | 98 |
| 2-4 | 0 | 140 | 390 | 470 | 430 | 590 | 200 | 160 | 590 | 100 | 580 | 98 |
| 2-5 | 0 | 0 | 80 | 130 | 160 | 220 | 140 | 60 | 220 | 100 | 220 | 100 |
| 2-6 | 0 | 0 | 10 | 60 | 100 | 150 | 140 | 50 | 150 | 100 | 140 | 93 |
| 2-7 | 0 | 150 | 330 | 380 | 440 | 480 | 150 | 40 | 460 | 96 | 490 | 102 |
| 2-8 | 0 | 170 | 360 | 400 | 440 | 470 | 110 | 30 | 350 | 74 | 400 | 85 |
| 2-9 | 0 | 100 | 290 | 350 | 420 | 475 | 185 | 55 | 420 | 83 | 450 | 95 |
| 1-10 | 0 | 190 | 390 | 410 | 450 | 480 | 90 | 30 | 200 | 42 | 350 | 73 |

| Ex. No. | Compressive strength (N/mm²) 7 d | Remarks |
|---|---|---|
| 2-1 | 34.9 | Inventive |
| 1-4 | 35.0 | Inventive |
| 2-2 | 35.7 | Inventive |
| 2-3 | 38.8 | Inventive |
| 2-4 | 39.0 | Inventive |

TABLE 2-continued

| | | |
|---|---|---|
| 2-5 | 36.8 | Inventive |
| 2-6 | 28.0 | Comparative |
| 2-7 | 36.0 | Inventive |
| 2-8 | 37.0 | Inventive |
| 2-9 | 36.3 | Inventive |
| 2-10 | 36.0 | Comparative |

(A)*: Stored Expansive material 7 d
(B)*: Residual Expansion Rate (Stored Material 7 d/7 d)
(C)*: Stored Expansive Cement Material 7 d
(D)*: Residual Expansion Rate (Stored Material 7 d/7 d)

As can be seen from Table 2, the inventive expansive materials (Experiment No. 1-4, and Experiment Nos. 2-1 to 2-9) obtained using the inventive preparation process in which calcium carbonate was formed under the conditions for treatment with carbon dioxide gas: the flow rate of 0.01 to 0.1 L/min. and the temperature of 200 to 800° C. were found to have larger percent length changes for 2-7 d and 5-7 d, allow the cement compositions (concretes) to expand much more at the material age of 2 to 7 days and the concretes to have higher compressive strength at the material age of 7 days, and cause the expansion capability to decrease less even as stored over an extended period of time.

In contrast, the comparative expansive material (Experiment No. 2-10) obtained using the comparative preparation process in which carbon dioxide gas treatment was carried out at 1,000° C. without recourse to the formation of calcium carbonate was found to have smaller percent length changes for 2-7 d and 5-7 d, and cause the expansion capability to decrease as stored over an extended period of time.

Experimental Example 3

Example 1 was substantially repeated with the exception that commercially available expansive materials were treated. The results are set out in Table 3.

Commercial Expansive Material A:

50 parts of free lime, 12 parts of hauyne, 5 parts of calcium aluminoferrite ($4CaO.Al_2O_3.Fe_2O_3$), 3 parts of calcium silicate ($2CaO.SiO_2$), and 30 parts of calcium sulfate anhydrite.

Commercial Expansive Material B:

52 parts of free lime, 4 parts of calcium aluminoferrite ($4CaO.Al_2O_3.Fe_2O_3$), 10 parts of calcium silicate ($2CaO.SiO_2$), 12 parts of calcium silicate ($3CaO.SiO_2$) and 20 parts of calcium sulfate anhydrite.

TABLE 3

| Ex. No. | Type of the Expansive material | Carbon Dioxide Gas Treatment |
|---|---|---|
| 3-1 | Expansive material A treated with $CaO_2$ | Carried out |
| 3-2 | Expansive material A treated with $CaO_2$ | Carried out |
| 3-3 | Expansive material A | Not carried out |
| 3-4 | Expansive material B treated with $CaO_2$ | Carried out |
| 3-5 | Expansive material B treated with $CaO_2$ | Carried out |
| 3-6 | Expansive material B | Not carried out |

| | Conditions for Carbon Dioxide Gas Treatment | | | Amount of the Calcium |
|---|---|---|---|---|
| Ex. No. | Flow Rate (L/min) | Temp. (° C.) | Time (hours) | Carbonate Formed (%) |
| 3-1 | 0.05 | 600 | 0.25 | 1.7 |
| 3-2 | 0.05 | 600 | 1.0 | 5.0 |
| 3-3 | — | — | — | 0.0 |
| 2-4 | 0.05 | 600 | 0.25 | 1.9 |
| 3-5 | 0.05 | 600 | 1.0 | 5.8 |
| 3-6 | — | — | — | 0.0 |

| Ex. No.. | Presence of particles containing all Essential Minerals | Proportion of the Expansive Materials Added (parts) |
|---|---|---|
| 3-1 | Found | 7.0 |
| 3-2 | Found | 7.0 |
| 3-3 | Not found | 7.0 |
| 3-4 | Found | 7.0 |
| 3-5 | Found | 7.0 |
| 3-6 | Not found | 7.0 |

| | Percent Length Changes (%) | | | | | | | | | | | |
|---|---|---|---|---|---|---|---|---|---|---|---|---|
| Ex. No. | 0 | 1 d | 2 d | 3 d | 5 d | 7 d | 2-7 d | 5-7 d | (A)* | (B)* | (C)* | (D)* |
| 3-1 | 0 | 120 | 370 | 460 | 500 | 520 | 150 | 20 | 510 | 98 | 520 | 100 |
| 3-2 | 0 | 10 | 190 | 280 | 390 | 440 | 250 | 50 | 440 | 100 | 450 | 102 |
| 3-3 | 0 | 200 | 380 | 420 | 450 | 460 | 80 | 10 | 230 | 50 | 330 | 72 |

TABLE 3-continued

| 3-4 | 0 | 100 | 250 | 370 | 420 | 490 | 240 | 70 | 490 | 100 | 480 | 98 |
| 3-5 | 0 | 5 | 130 | 230 | 300 | 390 | 260 | 90 | 390 | 100 | 400 | 103 |
| 3-6 | 0 | 160 | 370 | 380 | 390 | 400 | 30 | 10 | 180 | 45 | 285 | 71 |

| Ex. No. | Compressive strength (N/mm$^2$) 7 d | Remarks |
|---|---|---|
| 3-1 | 38.5 | Inventive |
| 3-2 | 38.0 | Inventive |
| 3-3 | 34.0 | Comparative |
| 3-4 | 34.2 | Inventive |
| 3-5 | 33.5 | Inventive |
| 3-6 | 30.0 | Comparative |

(A)*: Stored Expansive material 7 d
(B)*: Residual Expansion Rate (Stored Material 7 d/7 d)
(C)*: Stored Expansive Cement Material 7 d
(D)*: Residual Expansion Rate (Stored Material 7 d/7 d)

As can be seen from Table 3, the inventive expansive materials (Experiment Nos. 3-1, 3-2, 3-4 and 3-5), in which the commercial expansive materials made up of pulverized clinker containing free lime, hydraulic compound and calcium sulfate anhydrite was heat treated in a carbon dioxide gas atmosphere to form calcium carbonate in it, were found to have larger percent length changes for 2-7 d and 5-7 d, permit the cement compositions to have higher compressive strength at the material day of 7 days, and cause the expansion capability to decrease less even as stored over an extended period of time in comparison with the comparative expansive materials (Experiment Nos. 3-3 and 3-6) in which there was no formation of calcium carbonate.

Experimental Example 4

Example 1 was substantially repeated with the exception that the commercial expansive material A was treated with off gases exiting out from a lime firing furnace instead of the carbon dioxide gas. The off gases from the lime firing furnace were composed of 40% $CO_2$, 7% $O_2$, 3% CO, and 50% $N_2$. The results are set out in Table 4.

As can be seen from Table 4, the expansive material (Experiment No. 4-1) carbonated with the off gases from the lime firing furnace was found to be more improved in terms of the expansion capability than the expansive material (Experiment No. 3-2) carbonated with the carbon dioxide gas.

Experimental Example 5

Clinker having such composition as shown in Table 5 was prepared using limestone and normal Portland cement as the raw materials, and then subjected to carbonation. Apart from this, 80 parts of clinker not subjected to carbonation and 20 parts of calcium sulfate anhydrite were formulated into an expansive material. Example 1 was substantially repeated with the exception that the expansive material was contained in an amount of 7 parts per 100 parts of the cement composition comprising cement and the expansive material. The results are tabulated in Table 5.
Used Materials
CaO Raw Material: Limestone
Cement: Normal Portland Cement, a commercial product
  $CaSO_4$ Raw Material: Calcium Sulfate Anhydrite having a Blaine's specific surface area of 3,000 cm$^2$/g.

TABLE 4

| | | Amount of the Calcium | Presence of Particles | Proportion of the |
|---|---|---|---|---|
| Ex. No. | Type of Gas | Carbonate Formed (%) | Containing All Essential Minerals | Expansive Material Added (parts) |
| 3-2 | Carbon Dioxide | 5.0 | Found | 7.0 |
| 4-1 | Off Gases | 3.6 | Found | 7.0 |

| Ex. No. | Percent Length Changes (%) | | | | | | | | | | | |
|---|---|---|---|---|---|---|---|---|---|---|---|---|
| | 0 | 1 d | 2 d | 3 d | 5 d | 7 d | 2-7 d | 5-7 d | (A)* | (B)* | (C)* | (D)* |
| 3-2 | 0 | 10 | 190 | 280 | 390 | 440 | 250 | 50 | 440 | 100 | 435 | 99 |
| 4-1 | 0 | 60 | 240 | 330 | 450 | 530 | 290 | 80 | 520 | 98 | 520 | 98 |

| Ex. No. | Compressive strength (N/mm$^2$) 7 d | Remarks |
|---|---|---|
| 3-2 | 38.0 | Inventive |
| 4-1 | 38.5 | Inventive |

(A)*: Stored Expansive material 7 d
(B)*: Residual Expansion Rate (Stored Material 7 d)
(C)*: Stored Expansive Cement Material 7 d
(D)*: Residual Expansion Rate (Stored Material 7 d/7 d)

TABLE 5

| Ex. No. | Clinker Mineral Composition (%) | | | | | | Carbon Dioxide Gas Treatment | Amount of the Calcium Carbonate Formed (%) |
|---|---|---|---|---|---|---|---|---|
| | f-CaO | Hauyne | C$_4$AF | C$_2$S | C$_3$S | CaSO$_4$ | | |
| 5-1 | 60 | 4 | 5 | 12 | 18 | 1 | Carried out | 5.2 |
| 5-2 | 60 | 4 | 5 | 12 | 18 | 1 | Not carried out | 0.0 |

| Ex. No. | Presence of particles containing all Essential Minerals | Proportion of the Expansion Materials Added (parts) |
|---|---|---|
| 5-1 | Found | 7.0 |
| 5-2 | Not found | 7.0 |

| Ex. No. | Percent Length Changes (%) | | | | | | | | | | |
|---|---|---|---|---|---|---|---|---|---|---|---|
| | 0 | 1 d | 2 d | 3 d | 5 d | 7 d | 2-7 d | 5-7 d | (A)* | (B)* | (C)* | (D)* |
| 5-1 | 0 | 10 | 120 | 130 | 300 | 420 | 300 | 120 | 420 | 100 | 420 | 100 |
| 5-2 | 0 | 300 | 370 | 400 | 420 | 430 | 60 | 10 | 100 | 23 | 290 | 67 |

| Ex. No. | Compressive strength (N/mm$^2$) 7 d | Remarks |
|---|---|---|
| 5-1 | 35.2 | Inventive |
| 5-2 | 30.0 | Comparative |

(A)*: Stored Expansive material 7 d
(B)*: Residual Expansion Rate (Stored Material 7 d)
(C)*: Stored Expansive Cement Material 7 d
(D)*: Residual Expansion Rate (Stored Material 7 d/7 d)

As can be seen from Table 5, the inventive expansive material (Experimental No. 5-1), in which pulverized clinker containing free lime (f-CaO), hydraulic compound (hauyne, C$_4$AF, C$_2$S, C$_3$S) and calcium sulfate anhydrite (CaSO$_4$) was heat treated in a carbon dioxide gas atmosphere to form calcium carbonate in it, with a further addition of calcium sulfate anhydrite, has been found to have larger percent length changes for 2-7 d and 5-7 d, permit the cement composition to have higher compressive strength at the material age of 7 days, and decrease less in terms of expansion capability even as stored over an extended period, as compared with with the comparative expansive material (Experimental No. 5-2) in which there is none of the calcium carbonate formed.

Experimental Example 6

Pop-out experimentation was carried out with expansive cement using the expansive material prepared in Experimental No. 3-2. Mortar composed of 7 parts of the expansive material per 100 parts of an expansive cement composition consisting of cement and the expansive material with a water-to-cement composition ratio of 50% and a cement composition-to-sand rate of ⅓ was mixed in a 20° C. room, and the mixing time after the charge of the materials was varied as shown in Table 6. In another experiment run, the cement and the commercial expansive material A used in Experiment No. 3-3 were separately charged into separate mixers as in an ordinary liquid concrete plate. The results are tabulated in Table 6.

Pop-Out Testing Method

Mixed mortar was molded into a flat sheet of 20×20×50 cm, which was smoothed on its surface. After aged in a room of 20° C. and 60%, the mortar surface was observed to find whether or there were pop-ups.

TABLE 6

| Ex. No. | Material | Mixing Time | Whether or not there were pup-outs | Remarks |
|---|---|---|---|---|
| 6-1 | Expansive cement using commercial expansive material A treated with CaO$_2$ | 15 seconds | Not found | Inventive |
| 6-2 | Expansive cement using commercial expansive material A treated with CaO$_2$ | 60 seconds | Not found | Inventive |
| 6-3 | Simultaneous charging of commercial expansive material A and cement | 15 seconds | Found | Comparative |
| 6-4 | Simultaneous charging of commercial expansive material A and cement | 60 seconds | Not found | Comparative |

As can be seen from Table 6, the expansive cements (Experiment Nos. 6-1 and 6-2) using the expansive material of Example 6, wherein the pulverized clinker was heat treated in a carbon dioxide gas atmosphere to form calcium carbonate in it, did not give rise to pop-outs even when the mixing time was short, but the samples (Experiment Nos. 6-3 and 6-4) obtained by the simultaneous charging of cement and the comparative expansive material with no calcium carbonate formed in it gave rise to pop-outs as the mixing time became short.

Example 7

The physical properties of mortar were estimated using the expansive material prepared in Experiment No. 2-3 and a shrinkage reducer. Per 100 parts of an expansive cement composition composed of cement and an expansive material, the expansive material was blended in an amount of 7 parts and the shrinkage reducer was blended in an amount of 2 parts and in the form replaced by water. Mortar with (water plus shrinkage reducer)-to-cement composition ratio of 50% and a cement composition-to-sand ratio of ⅓ was mixed in a 20° C. room to investigate expansion properties. Similar testing was performed of the commercial expansive material A used in Experiment No. 3-3 too.

Used Materials

Shrinkage Reducer: a commercial product SK Guard made by DENKA

TABLE 7

| Ex. No. | Expansive material | Shrinkage Reducer | 0 | 1 d | 2 d | 3 d | 5 d | 7 d | 2-7 d | 5-7 d | Remarks |
|---|---|---|---|---|---|---|---|---|---|---|---|
| 2-3 | Treated with $CO_2$ | 0 | 0 | 80 | 300 | 440 | 500 | 550 | 250 | 50 | Inventive |
| 7-1 | Treated with $CO_2$ | 2 | 0 | 70 | 390 | 680 | 810 | 880 | 490 | 70 | Inventive |
| 3-3 | Commercial Expansive material A | 0 | 0 | 200 | 380 | 420 | 450 | 460 | 80 | 10 | Comparative |
| 7-2 | Commercial Expansive material A | 2 | 0 | 190 | 490 | 550 | 580 | 600 | 110 | 20 | Comparative |

As can be seen from Table 7, the expansive material (Experiment No. 7-1) of Example 7, in which the pulverized clinker was heat treated in a carbon dioxide gas atmosphere to form calcium carbonate in it, with a further addition of the shrinkage reducer, has been found to be much more improved in terms of percent length changes for 2-7 d and 5-7 d as compared with the comparative expansive material (Experiment No. 7-2) in to which the pulverized clinker was free from calcium carbonate, with a further addition of the shrinkage reducer.

APPLICABILITY TO THE INDUSTRY

The expansive material of the invention and the process for preparing that expansive material could be widely used in the civil engineering and construction fields, because the inventive expansive material allows for a larger expansion of concrete at a material age of 2 to 7 days, enables initial compressive strength to grow high and storage stability to increase, and makes good enough fluid communication with expansive cement, with none of pop-outs even as the mixing time becomes short.

What is claimed is:

1. An expansive material, characterized by being obtained by heat treatment of clinker or pulverized clinker containing free lime, a hydraulic compound and calcium sulfate anhydrite in a carbon dioxide gas atmosphere to form calcium carbonate therein.

2. An expansive material as recited in claim 1, which contains a particle in which the free lime, hydraulic compound, calcium sulfate anhydrite and calcium carbonate are all present.

3. An expansive material as recited in claim 1, which has a calcium carbonate content of 0.5 to 10% by mass.

4. An expansive material as recited in claim 1, which has a Blaine's specific surface area of 1,500 to 9,000 $cm^2/g$.

5. An expansive material as recited in claim 1, wherein calcium sulfate anhydrite is further added to the clinker or pulverized clinker heat treated in a carbon dioxide gas atmosphere to form calcium carbonate therein.

6. An expansive material as recited in claim 1, wherein a shrinkage reducer is further added to the clinker or pulverized clinker heat treated in a carbon dioxide gas atmosphere to form calcium carbonate therein.

7. A cement composition, wherein an expansive material as recited in any one of claims 1 to 6 is blended with cement.

8. A process for preparing an expansive material as recited in any one of claims 1 to 6, characterized in that clinker or pulverized clinker containing free lime, a hydraulic compound and calcium sulfate anhydrite is heat treated to form calcium carbonate therein.

9. A process for preparing an expansive material as recited in claim 8, wherein the clinker or pulverized clinker is filled up in a carbonating vessel, while a carbon dioxide gas flow rate is set at 0.01 to 0.1 L/min. per liter of the vessel and a temperature prevailing within the vessel is set at 200 to 800° C. to form calcium carbonate.

* * * * *